UNITED STATES PATENT OFFICE.

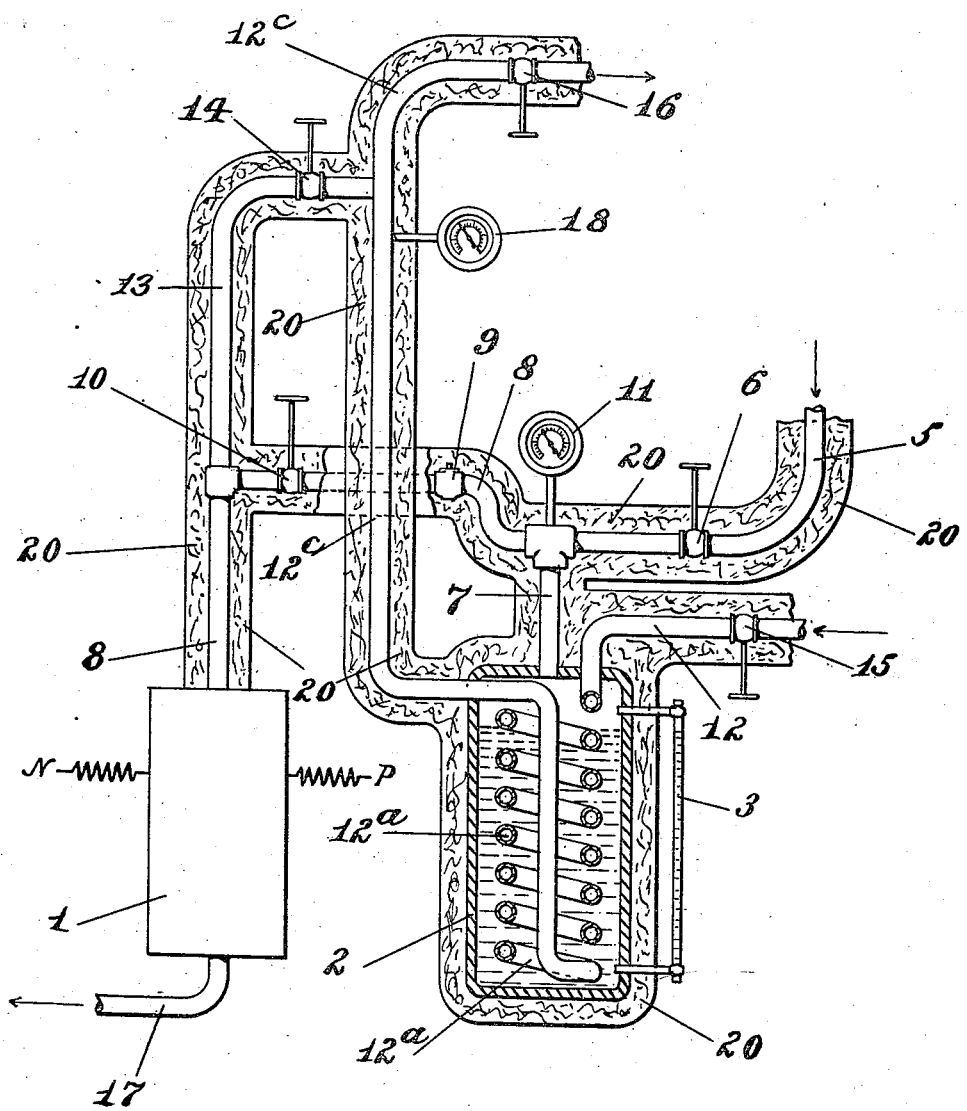

JAMES F. PLACE, OF GLEN RIDGE, NEW JERSEY.

ART OR PROCESS OF PRODUCING OZONE.

932,898.  Specification of Letters Patent.  Patented Aug. 31, 1909.

Application filed February 26, 1909. Serial No. 480,279.

*To all whom it may concern:*

Be it known that I, JAMES F. PLACE, a citizen of the United States, and resident of Glen Ridge, in the county of Essex and State of New Jersey, have invented certain new and useful Improvements in the Art or Process of Producing Ozone, of which the following is a specification.

This invention relates to the art or process of the production of ozone, and more especially to the production of ozone from oxygen.

Its object is to simplify the process, and to cheapen its cost; and to not only produce a larger percentage of ozone, but to produce ozone of greater intense activity.

I attain these objects in the manner as herein set forth, and a reference to the accompanying illustration will serve to explain my new art or process, in which the figure shows a longitudinal vertical section of a liquid oxygen evaporating tank, by which extremely cold oxygen vapors are conducted to an ozonizer—a well-known apparatus for subjecting the oxygen of the air to the silent discharge of an electric current.

In the drawing accompanying this specification, to illustrate my process, at 1, I show in elevation a representation of an ozonizer, the letters P and N showing the electric current conductors or terminals. It is unnecessary to describe this ozonizer, as it is a well-known apparatus, wherein air is passed through, and is therein subjected to the silent discharge of an electric current, and a percentage of the oxygen of the air is thereby converted into ozone.

Experience has proven that the lower the temperature is of the air admitted to the ozonizer, the greater is the percentage of the oxygen converted into ozone; and if pure oxygen is used instead of air, a much larger amount of ozone is produced.

In my process I use not only oxygen, but by taking the oxygen in liquid form, and causing it to evaporate and conducting such oxygen vapors and cold gases direct to the ozonizer, such gases are subjected to the electric discharge when at a temperature of about 300° below zero Fahrenheit. In this way a percentage of ozone is obtained about 10 times as great as if the same volume of pure oxygen gas were subjected to the electric current at a normal temperature say of +70° F. This ozone is intensely active, as it is not diluted with a large volume of nitrogen gas, as is the case when air is passed through the ozonizer.

To illustrate my process, I show in the drawing at 2 a liquid oxygen evaporating tank. At 3 I have a vertical gage glass, to show the height of the liquid in the tank; some other form of indicator will answer just as well. At 5 I show a liquid oxygen supply pipe, having a valve 6, and a connecting pipe 7 delivering to the tank. This liquid oxygen supply pipe (5) is supplied with liquid oxygen from an outside source, located so as to run into the pipe by gravity. To the pipe 7 is also connected the oxygen vapor pipe 8 leading to the ozonizer (1), and having the safety valve 9 and the shut-off cock 10. These pipes 5, 7 and 8 being all connected, the pipe 7 is used both as an inlet liquid oxygen supply pipe to and a gaseous oxygen or vapor outlet pipe from the vaporizing tank 2, having the pressure gage 11.

At 12 I show a compressed air pipe, which is supplied with dry compressed air from an outside source. This pipe enters the tank 2 as shown, and forms a coil $12^a$ submerged in the liquid oxygen in said tank. It continues up out of the tank in the pipe $12^c$, which has a branch 13 with valve 14. This branch pipe 13 is connected as shown to the oxygen vapor pipe 8 near where it enters the ozonizer.

The operation of the process is as follows: Liquid oxygen is admitted to the tank 2 until it is full by opening the inlet valve 6, and opening cock 10; then compressed air is admitted to the coils $12^a$ by opening valves 15 and 16. The liquid oxygen in tank 2 will boil rapidly, taking its heat of vaporization from the dry compressed air in the coils $12^a$, and the oxygen vapor and cold gas will pass up through pipes 7 and 8 through the valve 10 into the ozonizer, at a temperature of about —300° below zero Fahrenheit—depending upon its pressure and how pure it is. Being subjected to the electric current in the ozonizer, the gas is discharged therefrom through the outlet pipe 17, a large percentage thereof being converted into pure ozone of intense activity.

By regulating the opening of the liquid oxygen valve 6 and the compressed air valve 15, they may be adjusted so that the tank 2 will be maintained full of liquid constantly—the supply from valve 6 being just equal to the evaporation. By adjusting valve 16, the pressure of the air in coils $12^a$ may be maintained at any desirable tension, as indicated by the pressure gage 18. If this tension in coils $12^a$ is above the critical pressure for condensation at the temperature of the liquid in tank 2 (say about two atmospheres) the compressed air in the coils will become liquefied, and such liquid air may be delivered from the pipe $12^c$ to a liquid air separator, and separated into nitrogen gas and liquid oxygen—the latter being used to help supply the tank 2 through supply pipe 5.

If it is desirable to mix the oxygen vapor being delivered to the ozonizer through pipe 8, with some air, valve 16 may be opened, then the pressure of the air in the submerged coils $12^a$ will be at atmospheric tension, and the air therein will not liquefy; but will be in temperature within a few degrees of liquid air at atmospheric pressure; then valve 14 may be opened, and the oxygen vapor and cold oxygen gas being delivered to the ozonizer through pipe 8, may be given through branch pipe 13 any desired proportion of air, in same relative constituency as the atmosphere—79% nitrogen and 21% oxygen—but at a temperature almost at the point of liquefaction.

All the parts are insulated from outside heat by the non-conducting packings 20.

Having thus described my invention, what I claim as new and original and desire to secure by Letters Patent, is—

1. The art or process of producing ozone, which comprises evaporating liquid oxygen by heat drawn from a column of air in a pipe submerged therein, and subjecting the cold vapor and oxygen gases from said evaporating liquid to an electric current in an ozonizer.

2. The art or process of producing ozone which comprises evaporating liquid oxygen by heat drawn from atmospheric air, then mixing said cold vapors from said evaporating liquid with portions of the cooled air used to evaporate the same, and conducting said cold gaseous mixture through an ozonizer.

3. The art or process of producing ozone, comprising the method of evaporating liquid oxygen by heat drawn from compressed air being liquefied, and conducting the vapors and cold gases from said evaporating liquid through an ozonizer; then replenishing said liquid oxygen being thus evaporated, by the oxygen of said liquefied compressed air.

Signed at New York in the county of New York and State of New York this 13th day of February A. D. 1909.

JAMES F. PLACE.

Witnesses:
CHAS. EDW. PLACE,
J. G. GADSDEN.